United States Patent [19]

Nebelung

[11] Patent Number: 4,636,241
[45] Date of Patent: Jan. 13, 1987

[54] TAKE-OUT MECHANISM FOR REMOVING CONTAINERS FROM A MOULD OF A GLASSWARE FORMING MACHINE

[75] Inventor: Hermann H. Nebelung, Zurich, Switzerland

[73] Assignee: Emhart Industries, Inc., Farmington, Conn.

[21] Appl. No.: 840,983

[22] Filed: Mar. 14, 1986

Related U.S. Application Data

[63] Continuation of Ser. No. 666,695, Oct. 31, 1984, abandoned.

[30] Foreign Application Priority Data

Nov. 16, 1983 [GB] United Kingdom ............... 8330575

[51] Int. Cl.⁴ .............................................. C03B 9/44
[52] U.S. Cl. ..................................... 65/260; 65/239;
65/241; 294/82.3; 294/86.27; 294/86.29
[58] Field of Search ............ 65/239, 241, 260, 374.15;
294/82.3, 86.27, 86.29

[56] References Cited

U.S. PATENT DOCUMENTS

| 1,436,825 | 11/1922 | Sanford | 65/374.15 |
| 1,749,869 | 3/1930 | Baumbach | 294/86.27 |
| 1,795,665 | 3/1931 | Miller | 65/260 |
| 1,986,765 | 1/1935 | Smith | 65/260 X |
| 3,039,811 | 6/1962 | Bradley et al. | 294/82.3 |

FOREIGN PATENT DOCUMENTS 1056413 1/1967 United Kingdom .

Primary Examiner—Arthur Kellogg
Attorney, Agent, or Firm—H. Samuel Kieser

[57] ABSTRACT

Containers are removed from a mould by a take-out mechanism which comprises a container centring member which is mounted for movement between a lower, operative, position thereof, in which the member can project into a neck opening of a container before the container is gripped by gripper members of the take-out mechanism, and a upper, out-of-the-way position. In its operative position, the centring member prevents displacement of tilting of a container into which it projects.

1 Claim, 1 Drawing Figure

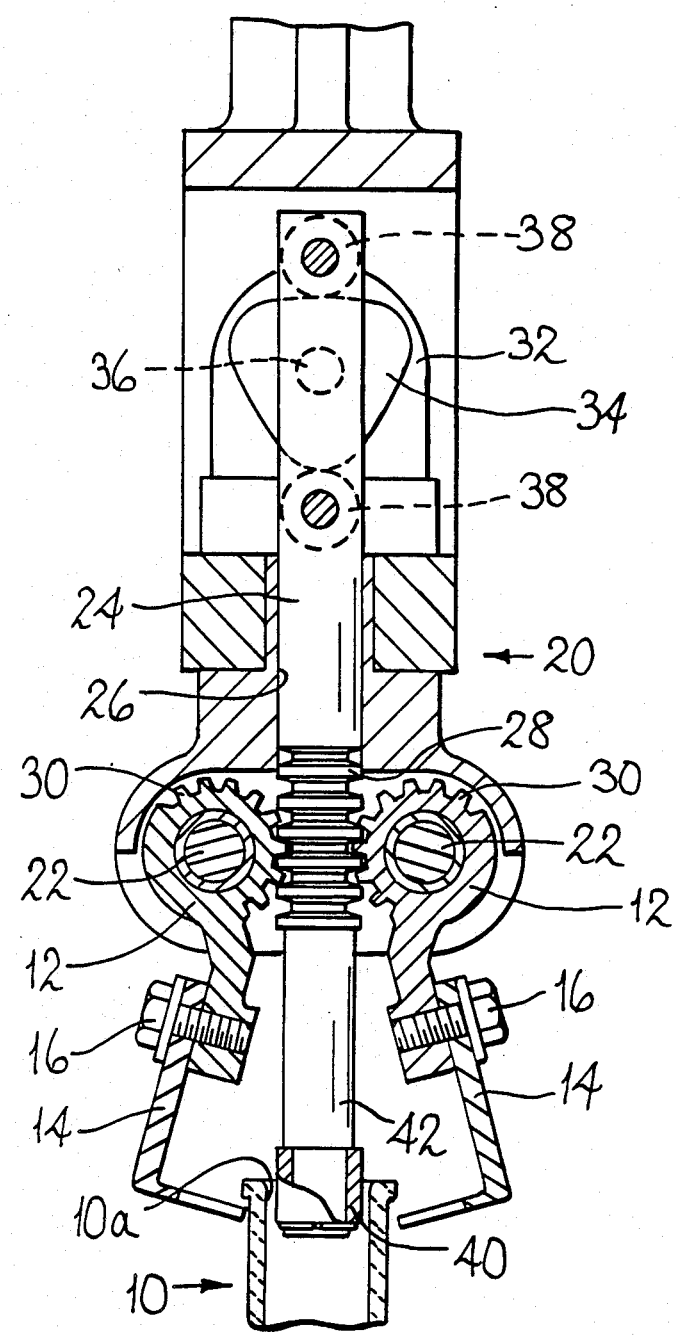

TAKE-OUT MECHANISM FOR REMOVING CONTAINERS FROM A MOULD OF A GLASSWARE FORMING MACHINE

This is a continuation of co-pending application Ser. No. 06/666,695 filed on Oct. 31, 1984, now abandoned.

BACKGROUND OF THE INVENTION

This invention is concerned with removing containers from a mould of a glassware forming machine and in particular with a take-out mechanism operable to remove containers from a mould of a glassware forming machine, the mechanism comprising two gripper member supports on which gripper members are mounted for movement towards one another into a gripping condition thereof or away from one another into a releasing condition thereof, a carrier on which each gripper support is mounted for pivoting movement about a horizontal axis to move the gripper member mounted thereon between its gripping and releasing conditions, operating means operable to pivot the gripper member supports as aforesaid, and moving means operable to move the carrier between a first position thereof at which the gripping members can grip a container and a second position thereof at which the gripping members can release the container on to a support. The invention is also concerned with a method of removing containers from a mould of a glassware forming machine which comprises mould portions which are movable between a mould-closed position thereof, in which a container can be moulded in the mould, and a mould-open condition thereof, in which a container can be removed from the mould, the containers being removed by a take-out mechanism.

In glassware forming machines of the so-called "individual section" type, a take-out mechanism is used to remove newly moulded articles of glassware from moulds of the machine and position them on a deadplate of the machine for subsequent removal to a conveyor which removes the articles from the machine. The carrier of the take-out mechanism is mounted to turn as a unit about a horizontal axis to maintain a container gripped by the gripper members thereof in a vertical alignment as an arm on which the carrier is mounted is moved in an arc about a further horizontal axis. Movement of the arm about the further horizontal axis moves the carrier between the first position thereof above a mould of the glassware forming machine and the second position thereof above the deadplate of the machine.

As the mould portions of the mould of a glassware forming machine are moved from their mould-closed condition into their mould-open condition, it is possible for the container which has just been moulded in the mould and which is left standing on a bottom plate of the mould, to become attached to a portion of the mould and/or to become displaced from its correct location. In such a case, the container no longer rests vertically on the bottom plate but is tilted to a position between the bottom plate and the mould portion. Such a displacement of the container can cause the edges of the mould portion to become damaged by splinters of glass and/or the mould to become jammed, this being particularly likely to occur when two or three containers are being moulded simultaneously adjacent to one another as a tilted container may contact an adjacent container and stick thereto.

It is an object of the present invention to reduce the possibility of a container becoming displaced or tilted before it is removed from the mould.

BRIEF SUMMARY OF THE INVENTION

The invention provides a take-out mechanism operable to remove containers from a mould of a glassware forming machine, the mechanism comprising two gripper member supports on which gripper members are mounted for movement towards one another into a gripping condition thereof or away from one another into a releasing condition thereof, a carrier on which each gripper support is mounted for pivoting movement about a horizontal axis to move the gripper member mounted thereon between its gripping and releasing conditions, operating means operable to pivot the gripper member supports as aforesaid, and moving means operable to move the carrier between a first position thereof at which the gripper members can grip a container and a second position thereof at which the gripper members can release the container on to a support, wherein the take-out mechanism also comprises a container centering member which is mounted on the carrier for movement between a lower, operative, position thereof, in which the member can project into a neck opening of a container before the container is gripped by the gripper members, and an upper, out-of-the-way, position thereof.

In a take-out mechanism according to the last preceding paragraph, the centering member prevents displacement of the neck portion of the container thereby preventing the container from tilting or being displaced on the bottom plate of the mould.

Conveniently, the centering member is arranged to move into its operative position when the gripper members are moved into their releasing condition and into its out-of-the-way position when the gripper members are moved into their gripping condition. Thus, as the gripper members are moved into their gripping condition in which they will prevent sideways displacement of the container, the centering member is withdrawn from the neck opening of the container.

In a take-out mechanism in which the operating means comprises an operating rod mounted on the carrier for longitudinal movement in a vertical direction, the operating rod being connected to the gripper member supports so that, when the operating rod is moved in the vertical direction, the gripper member supports are caused to pivot as aforesaid, conveniently, the centering member is mounted on a downwards extension of the operating rod for movement therewith.

In order to prevent the centering member from being detrimentally affected by heat from the container, a portion of the centering member which comes into opposed relationship with wall portions of the container may be made of hard graphite.

The invention also provides a method of removing containers from a mould of a glassware forming machine which comprises mould portions which are movable between a mould-closed condition thereof, in which a container can be moulded in the mould, and a mould-open condition thereof, in which a container can be removed from the mould, the containers being removed by a take-out mechanism which comprises two gripper member supports on which gripper members are mounted for movement towards one another into a gripping condition thereof or away from one another into a releasing condition thereof, a carrier on which each gripper support is mounted for pivoting movement about a horizontal axis to move the gripper member mounted thereon between its gripping and releasing conditions, operating means operable to pivot the gripper member supports as aforesaid, and moving means operable to move the carrier between a first position thereof at which the gripper members can grip a container and a second position thereof at which the gripper members can release the container on to a support, and the take-out mechanism also comprises a container centering member which is mounted on the carrier for movement between a lower, operative, position thereof, in which the member can project into an neck opening of a container before the container is gripped by the gripper members, and an upper, out-of-the-way, position thereof, the method comprising moving the carrier of the take-out mechanism into its first position while the mould portions are in their mould-closed position and the gripping members of the take-out mechanism are in their releasing condition so that the centering member of the take-out mechanism projects into a neck opening of a container in the mould, moving the mould portions into the mould-open condition thereof, operating the operating means of the take-out mechanism so that the gripper members move into their gripping condition gripping the container while withdrawing the centering member from the neck opening by moving it to its out-of-the-way position, and moving the carrier of the take-out mechanism to its second position.

BRIEF DESCRIPTION OF THE DRAWING

There now follows a detailed description, to be read with reference to the accompanying drawing, of a take-out mechanism and a method of removing containers from a mould of a glassware forming machine which are illustrative of the invention. It is to be understood that the illustrative take-out mechanism and the illustrative method have been selected for description by way of example and not of limitation of the invention.

The drawing is a vertical cross-sectional view taken through the illustrative take-out mechanism.

DETAILED DESCRIPTION OF PREFERRED EMBODIMENT OF THE INVENTION

The illustrative take-out mechanism is operable to remove containers 10 from a mould of a glassware forming machine (not shown). The illustrative mechanism comprises two gripper member supports 12 on which gripper members 14 are mounted by means of screws 16 for movement towards one another into a gripping condition thereof or away from one another into a releasing condition thereof (shown in the drawing). The illustrative mechanism also comprises a carrier 20 on which each gripper support 12 is mounted for pivoting movement about a horizontal axis provided by a rod 22 of the carrier 20. There are two rods 22 which extend parallel to one another and each receives a cylindrical portion of one of the supports 12 so that the support can pivot in a vertical plane about a longitudinal axis of its associated rod 22. The supports 12 are mounted for pivoting movement about horizontal axes to move the gripper member 14 mounted thereon between its gripping and releasing conditions.

The illustrative take-out mechanism also comprises operating means operable to pivot the gripper member supports 12 as aforesaid. The operating means comprises an operating rod 24 mounted on the carrier 20 for longitudinal movement in a vertical direction, the operating rod 24 is slidable in a cylindrical vertically-extending passage 26 of the carrier 20 and is connected to the gripper member supports 12 so that, when the operating rod 24 is moved in the vertical direction, the gripper member supports 12 are caused to pivot as aforesaid. The connection between the operating rod 24 and the supports 12 is in the form of a meshed connection between cylindrical teeth 28 formed on a cylindrical portion of the operating rod 24 and teeth 30 formed on portions of the supports 12 which are arcuate about central axes of the rods 22. Thus, when the operating rod is moved vertically moving the teeth 28, the arcuate portions of the supports 12 are caused to turn about the axes of the rods 22 thereby turning the supports 12 and the gripper members 14 about those axes. The operating means of the illustrative take-out mechanism also comprises driving means operable to move the operating rod vertically as aforesaid. The driving means comprises a rotary hydraulic motor 32 operable to rotate a cam 34 through an angle of 60° about an axis 36, the motor 32 being mounted on the carrier 20. The cam 34 is located between two rollers 38 mounted on the operating rod 24 and engages the rollers at opposite sides of the cam 34. The cam 34 is of generally triangular shape having three lobes spaced at 120° angles thereon. The cam 34 is designed to be of constant diameter along a line joining the two rollers 38 during rotation of the cam 34 through the 60° angle. In the drawing, the lower roller 38 is engaging a lobe of the cam while the upper roller 38 is engaging a portion of the cam 34 midway between two lobes. Rotation of the cam 34 by operation of the motor 32 through the 60° angle brings the upper roller 38 into engagement with one of the lobes on the cam 34 by moving the operating rod 24 upwardly, this upward movement serving to turn the supports 12 to bring the gripper members 14 into their gripping condition. A further operation of the motor 32 to turn the cam 34 through a further angle of 60° or back through the the same 60° angle moves the operating rod 24 downwards bringing the mechanism back to the condition shown in the drawing, thereby moving the gripper members 14 back to their releasing condition.

The illustrative take-out mechanism also comprises moving means (not shown) which are of conventional construction and are operable to move the carrier 20 between a first position thereof (in which it is shown in the drawing) at which the gripper members 14 can grip a container 10 and a second position thereof at which the gripper members 14 can release the container 10 on to a support. The moving means comprises an arm on which the carrier 20 is pivotally mounted for movement about a horizontal axis to maintain a container gripped by the gripper members 14 in vertical alignment and means for moving the arm about a further horizontal axis to move the carrier 20 between its first and its second positions.

The illustrative take-out mechanism also comprises a container centering member 40 which is mounted on the carrier 20 for movement between a lower, operative, position thereof, in which the member 40 can project into a neck opening 10a of the container 10 before the container 10 is gripped by the gripper members 14, and an upper, out-of-the-way, position thereof. The centering member 40 is mounted on a downwards extension 42 of the operating rod 24 for movement therewith. Thus, when the operating rod 24, is moved downwards to bring the gripper members 14 into their releasing condition, the centering member 40 is moved downwards into its operative position (shown in the drawing) and, when the operating rod 24 is moved upwardly to bring the gripper members 14 to their gripping condition, the centering member 40 is moved to its out-of-the-way position. Thus, the centering member 40 is arranged to move into its operative position when the gripper members 14 are moved into their releasing condition and into its out-of-the-way position when the gripper members are moved into their gripping condition. The centering member comprises a cylindrical piece of hard graphite so that portions thereof which come into opposed relationship with wall portions of the container 10 will not be damaged by heat received from the container 10.

The illustrative take-out mechanism is used in the illustrative method of removing containers from a mould of a glassware forming machine. In the illustrative method, the containers are removed from a mould of a glassware forming machine of the individual section type which, as is well known, comprises mould portions which are movable between a mould-closed condition thereof, in which a container can be moulded in the mould, and a mould-open condition thereof, in which a container can be removed from the mould. The mould portions move away from one another into their mould-open condition by moving along arcuate or linear paths and return along those paths to move the mould portions into their mould-closed condition. In the illustrative method, the carrier 20 of the illustrative take-out mechanism is moved into its first position while the mould portions of the mould are in their mould-closed position and the gripping members 14 are in their releasing condition so that the centering member 40 projects into a neck opening 10a of a container 10 in the mould. Next in the illustrative method, the mould portions are moved into the mould-open condition thereof, the centering member 40 serving to prevent the container 10 from tilting or moving as this occurs. Next, the operating means of the take-out mechanism is operated, i.e. the motor 32 is operated, so that the gripper members 14 move into their gripping condition gripping the container 10 while withdrawing the centering member 40 from the neck opening by moving it to its out-of-the-way position. Next, the carrier 20 of the take-out mechanism is moved to its second position carrying with it the container 10 and the container 10 is released by moving the gripper members 14 to their releasing condition by a further operation of the motor 32. When this occurs, the centering member 40 moves back into the neck opening in the container 10 and serves to maintain the container 10 in its correct position until the carrier 20 is moved away from its second position to collect another container from its first position.

I claim:

1. A take-out mechanism operable to remove containers from the mould of a glassware forming machine, the mechanism comprising a carrier, two gripper member supports pivotably mounted on said carrier for movement about a horizontal axis toward and away from each other, a gripper member mounted on each of said gripper member supports, an operating rod mounted on said carrier for longitudinal movement in a vertical direction, means on said carrier for moving said operating rod upwardly and downwardly, means interconnecting said operating rod and said gripper member supports so that when the operating rod is moved downwardly the gripper member supports are moved away from each other and when said operating rod is moved upwardly, said gripper member supports are moved toward each other, said lower portion of said operating rod having a centering member thereon which when said operating rod moves downwardly, extends into the neck portion of a container and when said operating rod moves upwardly is withdrawn from the neck portion of the container.

* * * * *